April 6, 1965  J. W. DRENNING ETAL  3,176,557
CUT-OFF KNIFE CONTROL
Original Filed Dec. 27, 1957  2 Sheets-Sheet 1

INVENTORS.
JAMES P. HAAS
JOHN W. DRENNING.
BY Oscar B. Brumbeck.
their ATTORNEY.

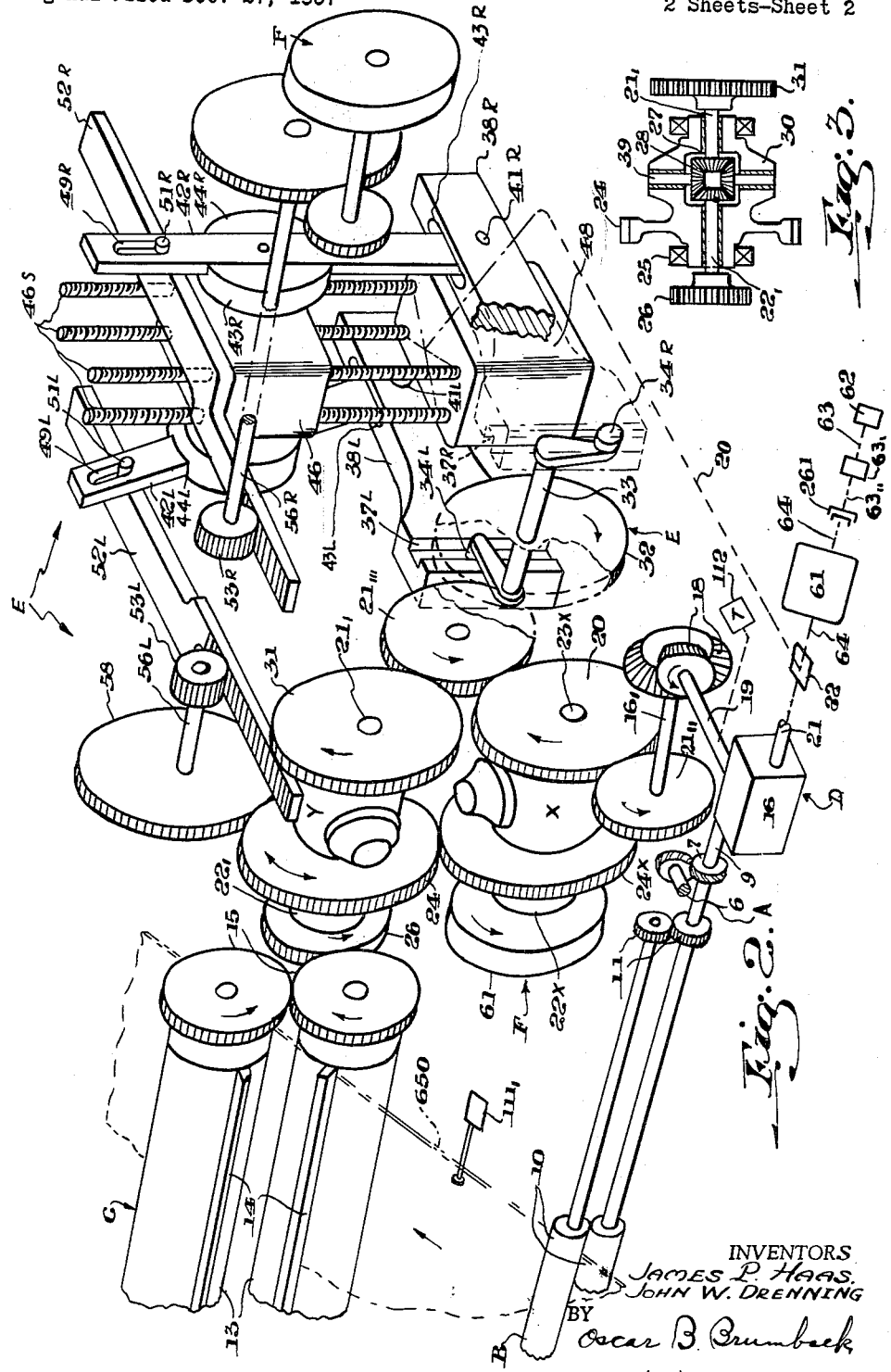

United States Patent Office 3,176,557
Patented Apr. 6, 1965

3,176,557
CUT-OFF KNIFE CONTROL
John W. Drenning and James P. Haas, Baltimore, Md., assignors to Koppers Company, Inc., a corporation of Delaware
Continuation of application Ser. No. 705,605, Dec. 27, 1957. This application Oct. 15, 1962, Ser. No. 230,666
7 Claims. (Cl. 83—76)

This invention relates generally to control means for shears and more particularly to control means for rotary shears which transversely cut longitudinally moving material to various predetermined lengths. This application is a continuation of United States patent application Serial No. 705,605 filed December 27, 1957, and now abandoned.

Machines for the cutting of longitudinally moving material such as paper, boards, etc., have been used with two drums rotatable about parallel axes, each drum carrying a blade and two blades meeting at each revolution to sever the material. Such machines preferably bring the peripheral speed of the blades at the instant of cut substantially to the linear speed of the material being cut thereby.

If the shears are driven at a uniform speed of the proper value to produce a blade velocity equal to that of the material, the material will be cut into lengths equal to the circumference of the shear circle which may be described as the circle in which the cutting edge of the blades travel. Improvements have been made in such machines by providing mechanisms which accelerate and decelerate and/or oscillate the cutting drums between successive cuts so that the lengths of material cut may be either longer or shorter than, or the same as, the shear circle circumference of the cutter blades. Other improvements have been made which eliminate the reversing torques created in accelerating and decelerating and/or oscillating these cutting drums.

Improvements in the controls for such machines are now needed especially since the tendency in the paper board industry today of running more and more small orders of different sheet lengths has rendered the arrangements, heretofore in use, of manual control and adjustment of sheet lengths being cut by such shearing machines impractical and inadequate to keep pace with present day demands. Furthermore, the tendency in the paper board industry toward greater and greater efficiency and speed has rendered obsolete the control systems heretofore in use because of the inherent limitations in manual control means of inaccuracies of cut.

To handle the increased amounts of small orders, automatic remote control means are now necessary which will quickly change the sheet length being cut from one size to another without stopping the cut-off machine, and which continuously sense and monitor sheet length being cut so that inaccuracies in the cuts desired can be automatically corrected even while the board is being fed to the cut-off knife at high speed.

An object of the present invention is to provide shears with control means whereby the shears can be adjusted easily and quickly to cut new sheet lengths while the shears are operating.

A further object of the present invention is to provide control means for shears which sever sheets of longitudinally moving material to different pre-selected lengths so that scrap is greatly reduced.

A further object of the present invention is to provide shears with control means whereby a new sheet length may be selected simultaneously with the cutting of previously pre-selected sheet lengths and with control means whereby a subsequent automatic means is provided for changing to a new sheet length when ready for it.

A further object of the present invention is to provide rotary shears which cut material into lengths either longer or shorter than, or the same length as, the shear circle circumference of the cutters and which are internally well balanced to eliminate reversing torques caused by accelerating and decelerating and/or oscillating the rotary shears with control means which can be adjusted easily and quickly to cut new sheet lengths with great accuracy and which maintain that accuracy automatically while the shears are operating.

Various other features of the present invention will become obvious when the description set forth hereinafter is read in connection with the accompanying drawings. It is to be understood, however, that various changes can be made by one skilled in the art, in the arrangement form, and construction of the apparatus disclosed herein without departing from the scope of the present invention.

Referring to the drawings which illustrate an advantageous embodiment of the invention, the reference numerals of which indicate like parts:

FIG. 2 is an isometric view substantially disclosing details of a portion of rotary shears shown in block form in FIGURE 1; and FIG. 3 is a schematic broken elevational view of the differential unit of FIGURE 2.

Figure 1:
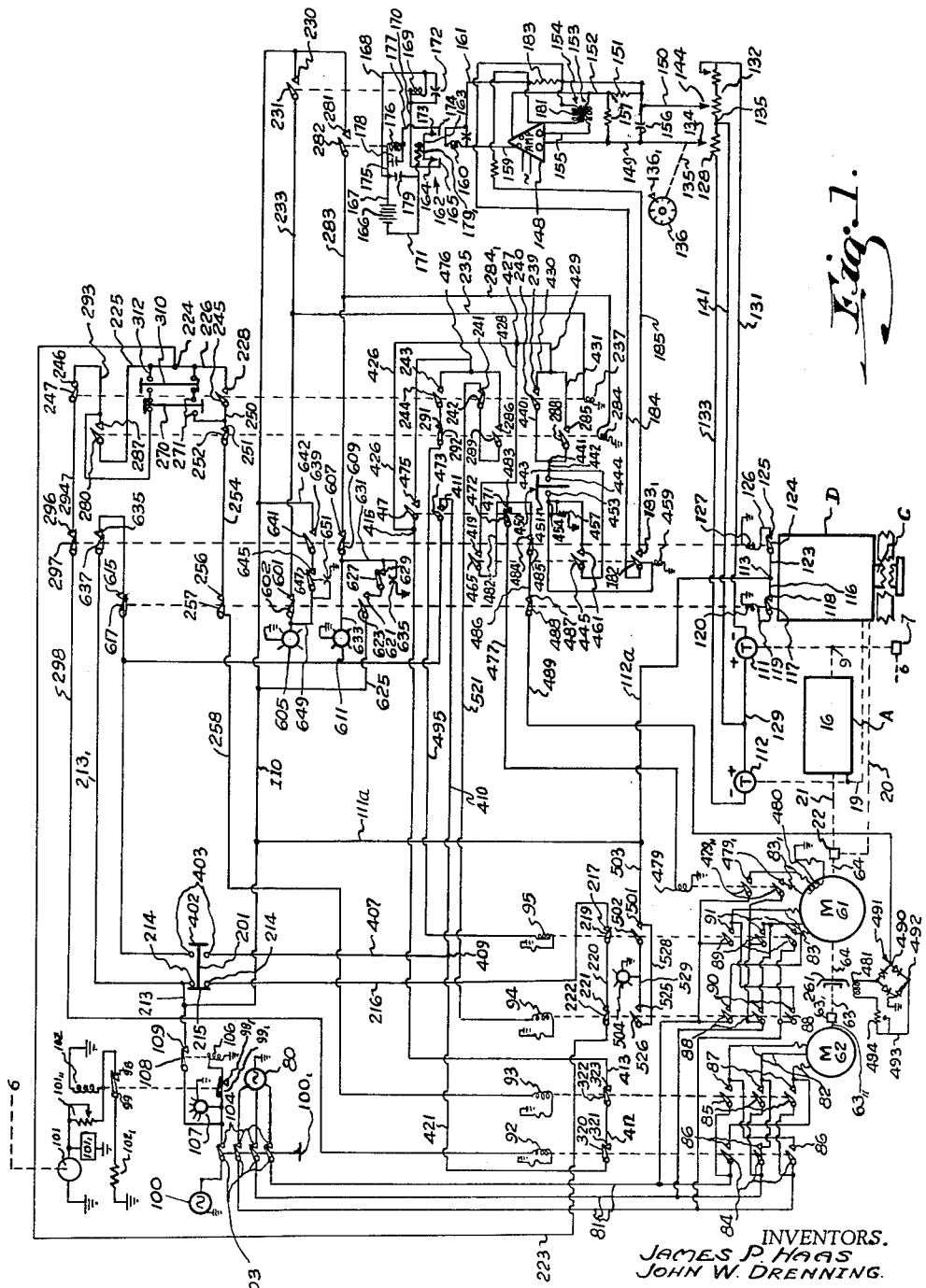
FIG. 1 is a schematic drawing of the electrical circuits and mechanical elements of the novel cut-off knife arrangement of the invention.

Referring to FIGURE 2, the invention includes generally a main drive A providing the prime movement for a feeder B which feeds the strip of material to the cutter C, a mechanism D for varying the average rate of turning of the cutters relative to the rate of turning of the drive shaft, a cycling device E for varying the substantially constant rate of rotary motion imparted to the cutters to a cycle wherein cutters are accelerated and decelerated and/or oscillated so that the cutters reach a peripheral speed equal to the linear speed of the strip to be cut at the moment of cutting, and a balancing arrangement F for neutralizing any reversing torque due to the accelerating and decelerating of the cutters.

The main drive A may be a shaft 6 which rotates at substantially constant speed and for purposes of convenience may be a line shaft connected to other machinery, as for example a material fabricating machine (not shown). This shaft through gear 7 turns a shaft 9 which drives both the feeder B and the cutters C.

Feeder B is illustrated herein as a pair of rolls 10 of a type well known in the art for feeding strip material such as paper. The turning of these rolls is synchronized by meshing gears 11 and are driven at substantially constant speed by the power shaft 6. Thus, these rolls feed the strip of material to the cutters C at a substantially uniform and constant rate.

Cutters C are shown herein as a pair of cutter carriers 13 of conventional type each having mounted thereon in a well known manner a conventional knife blade 14. The rotation of the cutter carriers is synchronized by meshing gears 15. At every revolution of the rolls blades 14 meet and shear the moving feed of material.

The peripheral speed of the blades at the time of the cutting of the material must be equal to the linear speed of the material to make a clean cut of the material. However, if carriers 13 turn at a constant rate such that the tangential velocity of each blade equals the linear velocity of the material, the length of sheets cut will be equal to the circumference described by each knife blade 14.

Therefore, it is necessary to increase or decrease the time that elapses between two consecutive meetings of the blades to cut sheets of different lengths. Since the blades must always reach the sheet speed at the time of the shearing of the sheet, the angular velocity of the rolls must vary during each revolution. Thus, sheets of any length can be obtained by controlling the average speed of the rolls and the variations of angular speed during each revolution. Accordingly an adjustable ratio transmission 16 connects shaft 9 to a shaft 19 which in turn is connected by bevel gearing 18 to a drive shaft 16' and to cutter rolls 13 through gears $21_{11}$, 20, and $21_{111}$ and the cycling mechanism Y comprising a differential gear mechanism and linkage assembly to be described later. Adjustable ratio transmission 16 determines the length of sheet being cut by determining the time which elapses between two consecutive meetings of blades 14. This adjustable ratio transmission 16 may be any suitable variable speed drive such as a conventional Link-Belt P.I.V. drive. The length of sheet depends only on the setting of this variable speed drive since it determines the length of time for a complete revolution of carriers 13.

The purpose of the oscillating and/or accelerating and decelerating mechanism E is to bring the peripheral speed of the knives 14 to the linear speed of the material being cut at the time of cutting. When short sheets are being cut, the carriers must speed up after the cut has been made, must slow down for another cut, then speed up and slow down again for the next cut. On the other hand when long cuts are being made, the process is reversed; the rolls must slow down immediately after the cut has taken place, then must speed up so that the blades reach a speed corresponding to that of the sheet at the time of cutting.

The varying speed of carriers 13, i.e., for oscillating and/or accelerating and decelerating carriers 13, is accomplished by a differential mechanism Y, FIG. 3, which includes three rotatable elements: output shaft $22_1$, input shaft $21_1$, housing 30. Output shaft $22_1$ is journalled in a bearing block member 25 and keyed to a gear 26 which meshes with the pair of gears 15 fixed to the carriers 13. Input shaft $21_1$ is connected to output shaft $22_1$ through an arrangement of meshing bevel gears 28. Housing 30 encloses these bevel gears including a ring gear portion 24. Input shaft $21_1$ is driven at constant speed through its gear 31 which is driven by gear $21_{111}$. As long as ring gear 24 is stationary, cutter-carriers 13 are driven at a constant speed from shaft $22_1$ through gears 28; but any angular velocity imparted to housing 30 through ring gear 24 will add to or subtract from the constant angular velocity imparted through output shaft $22_1$ to carriers 13. Thus, if ring gear 24 be rotated in the same direction as gear 31, the speed of the output shaft $22_1$ will be reduced and, if ring gear 24 be rotated in the opposite direction as gear 31, the speed of the output shaft will be increased. Thus, housing 30 can be rotated to accelerate and decelerate the cutter-carriers 13. It will be understood also from this and subsequent descriptions that if ring gear 24 is rotated fast enough in the same direction and opposite direction as gear 31 then the output shaft 22 will oscillate.

A linkage mechanism, FIGURE 2, rotates gear 24 to add to or subtract from the angular velocity of cutter-carriers 13 as is required for the particular length of material to be severed. The gear 32 of a crank shaft 33 is driven by gear $21_{111}$. Each end of crank shaft 33 carries a roller 34L, 34R in engagement with a slot 37L, 37R positioned at one end of a yoke member 38L, 38R which is slideably mounted in the spaced guide members (not shown) and which is attached by a pin 41L, 41R, a rocking arm 42L, 42R. The rocking arm is pivotally supported in a slot 43L, 43R which extends diametrically across a fulcrum member 44L, 44R that is journalled in a block 46. The block 46 cooperates with a base 48 and screws 46S to permit the block 46 to be slideably moved relative the base 48 and screws 46S are provided which moves the fulcrum block 46 causing the latter to change its relative position to base 48. A slot 49L, 49R extends along the longitudinal axis of each rocking arm and is energized by a roller 51L, 51R which is carried at one end of a rack 52L, 52R whose teeth engage with a pinion 53L, 53R carried by a shaft 56L, 56R. A spur gear 58 is fixed to shaft 56L and engages the ring gear 24 of differential housing 30. Thus, any rotary motion imparted to shaft 56L will, in turn, be imparted to the ring gear 24 of the differential mechanism to vary the speed of the output shaft $22_1$. The motion of the yoke member 38L will be transmitted to the shaft 56L through the rocking arm 42L and the rack and pinion arrangement 52L, 53L, and the amplitude of the rack motion is determined by the position of the pivot block 46 relative the base 48. For instance, if the distance between the center line of either yoke and the fulcrum axis is called $a$, the magnitude of $a$ determines the amplitude of motion for both racks. This amplitude in turn determines the amount of acceleration and deceleration and/or oscillation imparted to the rolls. When $a$ is small, the amplitude of the racks' motion is large and the knives 14 are set to cut material into long sheets. When $a$ is large, the amplitude of the racks' motion is small and the knives 14 are set to cut material into short sheets. Accordingly, pivot block 46 provides a regulating means which is cooperative with the linkage mechanism and which can be moved relative to base 48 by screw $46_s$ during the actual operation of the shear to control the amplitude of rack motion and thus regulate the amount of variation induced.

In operation, when the input shaft $21_1$ is driven at constant speed, output shaft $22_1$ at each revolution is accelerated and decelerated and/or oscillated by the action of the linkage that oscillates the ring gear 24. All the elements of the mechanism, however, occupy the same respective positions after one complete revolution of the shaft $21_1$. To insure that the cutting takes place between the cutter blades 14 when the angular velocity of the carriers 13 is at a maximum or minimum (which corresponds to zero acceleration) the blades on the carriers 13 are indexed to meet when the rocking arm 42L is perpendicular to both the longitudinal axis of rack 52L and the longitudinal axis of yoke 38L.

The reversing torques due to the acceleration and deceleration and/or oscillation of the carriers 13 are of such magnitude that the life of the drive may be impaired. To neutralize such torques so that the driving variable speed unit will be submitted to greatly reduced loads and its life extended, an internal counterbalance-means is provided which serves to separately balance reversing torques induced on gears 31 and 32. This counterbalance-means comprises a first counterbalance system including a second differential unit X identical to the unit Y discussed above having a housing and having a ring gear 24X engageable with ring gear 24 of the first differential Y and an input shaft 23X keyed to gear 20. Mounted on the output shaft 22X of differential unit X is a flywheel 61 having a mass polar moment of inertia equal to the mass moment of inertia of the rotating system comprised of the cutter-carriers 13 and blades 14 and the synchronizing gears 15. As gear 24 of differential Y is driven in one direction, gear 24X of the differential X is driven in the opposite direction; and as carriers 13 are accelerated, for example, flywheel 61 is decelerated in equal amount so that reversing torques on gears 20 and 31 are equal and opposite and thereby balanced.

The system is not completely balanced, however, since force required to move rack 52L is twice as large as it would be if only one differential gear 24 was driven, and this force results in a varying moment on the crank roller shaft 33. Therefore, the second rack and movement linkage 38R–56R is provided. Mounted on shaft 56R is a flywheel 62 having a mass polar moment of inertia of such magnitude that the moment or torque imparted to the crank roller shaft 33 through the first linkage mechanism 38R–56L is balanced. Fulcrum members 44L and 44R are so mounted that the second accelerating and decelerating linkage is out of phase with the first linkage. Thus, the torques created to accelerate and decelerate and/or oscillate the rolls and flywheels balance one another and the torque required to drive the system fluctuates little and has a comparatively low magnitude. Furthermore, the movement of pivot block 46 with relation to base 48 by screws 46S, regulates the amount of variation in instantaneous acceleration of cutters C induced by the cutter-carrier speed varying means. The mechanism so far described is claimed and described in further detail in U.S. Patent No. 2,879,845, to which reference is made for further details.

This invention incorporates with the foregoing structure a provision for automatic control of the length of sheet being cut, for presetting a future length of sheet to be cut while a predetermined length of sheet is being cut, and for resetting the control so that the actual length of sheet being cut corresponds to the predetermined length.

It will be remembered that the length of sheet being cut depends upon the period of time for one complete revolution of cutter blades, that the main drive shaft 6 rotates at a substantially constant rate, and that adjustable ratio transmission 16 varies the number of revolutions of cutter 14 relative to the number of revolutions of drive shaft 6 (shaft 9 being the input to transmission 16 and shaft 19 being the output).

In accordance with this invention a pair of conventional three phase electric motors, hereinafter termed a coarse adjusting motor 61 and a fine adjusting motor 62, are provided for adjusting the ratio of revolutions of output shaft 19 of transmission 16 to input shaft 9. The shaft 63 of fine adjusting motor 62 is attached to a gear box $63_1$ so that shaft $63_{11}$ rotates slower than shaft 63 the latter being attached to the shaft 64 of coarse adjusting motor 61 by means of a normally engaged electromagnetic clutch 261. The shaft 64 of coarse adjusting motor 61 will rotate freely when motor 61 is not energized and can thus be driven by motor 62. Shaft 64 by way of a suitable gear box 22 drives the control shaft 21 of transmission 16 and is further connected to drive a fulcrum control shaft 20a. The rotation of shaft 21 changes the ratio of angular velocities between the input shaft 9 and the output shaft 19, thus increasing or decreasing the average rate of time for a revolution of cutters 14. Fulcrum control shaft 20a by conventional gearing (not shown) drives screws 46S in fulcrum block 46; thus rotation of shaft 20a rotates screws 46S to move fulcrum block 46 relative to fulcrum base 48 and vary the instantaneous rate of movement of the cutters 14.

Excitation for motors 61 and 62 is provided from a suitable three phase power source 80 by way of leads 81. Conventional directional control armatures 84, 85 and contacts 86, 87 connect leads 81 and 82 so that when armatures 84 engage contacts 86 motor 62 turns in a clockwise direction and when armature 85 engage contacts 87 the motor turns in a counter clockwise direction. Similar directional control armatures 88, 89 and contacts 90, 91 turns in a clockwise direction and when armature 89 engages contacts 91 the motor turns in a counter clockwise direction. Armatures 84 are controlled by relay 92, armatures 85 by relay 93, armatures 88 by relay 94, and armatures 89 by relay 95. These relays are selectively actuated to control motors 61 and 62 and thereby the ratio of number of revolutions of the input shaft 9 of transmission 16 relative to the speed of output shaft 19 is changed.

For purposes of simplicity in explanation, a second electrical power source for the novel system of the invention is illustrated at 100 although it will be understood that by suitable connection this could be the same power source 80. Manual off-on switch $100_1$ is connected to armatures 103 engaged with contacts 104. The engagement of the lower three of those armatures and contacts connects source 80 and leads 81; and the engagement of the upper armature and contact connects source 100 with a light 107, armature 99, contact 98, relay 106, armature 108, contact 109, lead 110, lead 213, lead $213_1$, and contact 214. The illumination of light 107 indicates that electrical energy exists for the system.

Main drive motor 101 which is a conventional variable speed direct current motor drives shaft 6 which drives P.I.V. input shaft 9 and has a direct current variable voltage source $101_1$. Power resistor $101_{11}$ and relay 102 and this resistor is set so as to supply enough current to relay 102 to close armature 99 and contact 98, armature $99_1$ and contact $98_1$ only when the speed of motor 101 has reached a predetermined speed.

Another resistor $102_1$ is provided so that when armature 99 and contact 98 are closed relay 102 is partly by-passed by resistor $102_1$. This allows the armatures and contacts of relay 102 to open at a predetermined voltage, namely, armatures 99 and $99_1$ and contacts 98 and $98_1$ respectively. When armature $99_1$ and contact $98_1$ close relay 106 is energized therefore armature 108 closes with contact 109 which energizes bus lead 110. A circuit is provided for lead 110 to lead 111a and by way of lead 112a to a junction 113 for a pair of limit circuits. One limit circuit traced to ground includes lead 116 normally engaged armature and contact 117, 118, lead 119 and relay 120; and the other circuit includes lead 123 normally engaged armature and contacts 124, 125, lead 126 and relay 127.

Armatures 117 and 124 are so connected with fulcrum block 46 that one armature will be moved to open position and de-energize an appropriate relay when the fulcrum block 46 reaches a predetermined limit of adjustment. Thus, should fulcrum block 46 be adjusted upwardly to cut shorter sheets and reaches a predetermined limit, the fulcrum block 46 disengages armature and contacts 124 and 125 and de-energize relay 127. Should fulcrum block 46 be adjusted too far in the other direction, i.e., downwardly to cut longer sheets, it will disengage armature and contacts 117, 118 and de-energize relay 120.

As long as relays 120 and 127 are energized adjustments for the cutting of different sheet lengths can be made, but only manual remote adjustments can be made by the fine adjustment motor 62 if either relay is de-energized. Relay 120 is shown in an energized condition and when it is de-energized its armatures are pulled downwardly. Relay 127 is shown in an energized condition and when it is de-energized its armatures are pulled downwardly.

Motor 61 and 62 are under the control of a sheet length selector 136. This is a manually movable knob with suitable indicia thereon to indicate, in cooperation with an index $136_1$, the length of sheet to be cut. A suitable mechanical linkage 135 connects selector 136 with the wiper 134 of a potentiometer 128. Thus, the position of wiper 134 corresponds to a length of sheet set on selector 136. This potentiometer 128, with wiper 134, is shown in position of an arrangement for sensing the length of sheet being cut.

The length of sheet being cut is a function of the ratio of the output 19 of transmission 16 to the input 9. Thus the sheet length sensing means includes a pair of conventional tachometer generators 111 and 112 across a pair of potentiometers 128 and 132. By suitable mechanical elements, tachometer 111 is connected to the input shaft 9 of transmission 16 and tachometer 112 is connected to the output shaft 19 thereof. These tachometers, as is well known, produce output voltages or signals corresponding to the rate of turning of the respective shafts. To compare these voltages, the outputs of the tachometers are connected in opposition, that is, line 129 connects the positive terminals of tachometer 111 and tachometer 112, line 131 connects the negative terminal of tachometer 111 to potentiometer 132, line 133 connects the negative terminal of tachometer 113 to potentiometer 128, then potentiometers 128 and 132 connect at junction 135, and line 141 connects junction 135 to line 129. Any difference in potential across the two potentiometers can be sensed across wipers 134 and 144. The wiper 144 of potentiometer 132 is relatively fixed, and wiper 134 is adjustable through connector link 135 so that the balanced voltage across these potentiometers can be varied. So that the level of the low voltage potential difference across wipers 134 and 144 may be boosted to a usable voltage level, wipers 134 and 144 are connected to a conventional amplifier 148, wiper 134 being connected by lead 149 to one input of amplifier 148, and wiper 144 being connected by lead 150, resistor 151, lead 152, winding 153 of a transformer 154, and lead 155 to the other input. Leads 149 and 150 are also connected by way of condenser 156 and a resistor 157 is connected to leads 149 and 152. The output circuit for amplifier 148 includes lead 159, a galvanometer coil 160 and lead 161.

If the sheet length being cut by blades 14 be shorter than the sheet length set on selector 136, tachometers 111 and 112 will produce voltages at potentiometer 128 and 132, but the voltage at wiper 144 will be positive with respect to the voltage at wiper 134. This voltage difference will be supplied to the amplifier 148, and the corresponding amplified voltage from amplifier 148 supplied to winding 160 of a meter 162. This meter includes the galvanometer coil 160 and pointers 164 and 173 which are movable upon energization of the coil and contact points 165 and 174 which are engageable by the pointers. The polarity of this signal, at this time, is such that the pointer 164 moves to the left into the region marked "too short" (not shown), thus indicating that the length of sheet actually being cut is longer than the length of sheet set on selector 136. The greater the difference between the selected sheet length and the actual sheet length, the greater is the differential voltage and the greater is the deflection of pointer 164 until it engages contact 165. This engagement completes a circuit from a suitable source of direct current, such as battery 166, through leads 167 and 168, relay 169, lead 170, contacts 164 and 165 and lead 171, thereby energizing relay 169. A resistor 179 is provided which relieves transient current surges across contacts 164 and 165 so that these contacts will not weld during their closing or opening. This resistor may cause armature 231 to chatter and a condenser 172 is provided across relay 169 to prevent the latter.

If the sheet length actually being cut by knives 14 is longer than the sheet length setting of selector 136, the voltage of tachometers 111 and 112 will be such that the voltage at wiper 144 will be negative with respect to wiper 134. The corresponding voltage from amplifier 148 will appear at coil 160 and move the pointer 173 of meter 162 to the right into the scale region marked "too long" (not shown), thus indicating that the sheet length being cut is longer than the selected sheet length. The deflection of pointer increases with the voltage until pointer 173 engages contact 174. This engagement completes a circuit from direct current source 166 through leads 167 and 175, relay 176, lead 177, contacts 173, 174, and lead 171 to energize relay 176. A resistor 179 is provided which relieves transient overloads, across contacts 173 and 174 so that these contacts will not weld during their closing and opening. This resistor may cause armature 282 to chatter and a condenser 178 is provided across relay 176 to prevent the latter.

So that transient fluctations in the rate of turning of the tachometer shafts will not cause the pointer 164 and 173 to fluctuate, a damping circuit is provided across a feedback resistor 183 to degeneratively feedback oscillatory currents developed in meter coil 160 to the power amplifier 148 through coupling transformer 154 whose primary winding 181 is connected across resistor 183 and whose secondary winding 153 is connected to the amplifier input. To shunt this feedback when a rapid response is required, as will be described later, an armature 182 and contact 183 are connected by leads 184 and 185 upon resistor 183. Switch 201 is provided for placing the motors 61, 62 under control of selector 136. FIGURE 1 shows switch 201 in the automatic position for supplying current through lead 213, bridge 215 across contacts 214, lead 216, normally engaged armature and contact 219, 217, lead 220, normally engaged contact and armatures 221, 222, and lead 223 to a junction 224 and thence through parallel leads 225 and 226 to armature 280 and contact 287, respectively.

The engagement of pointer 164 and contact 165 of meter relay 162, when the sheet length being cut is shorter than the selected sheet lengths, completes a circuit to energize relay 169 which then engages contact 230 and armature 231 and thereby supplies power from leads 110 through contact 230 and armature 231, thereby supplying power from leads 110 through contact 230 and armature 231 to leads 233, 235 to energize relay 237. Thereupon relay 237 pulls its armatures downwardly, engaging contact 239 and armature 240, disengaging contact 241 and armature 242, engaging contact 243 and armature 244, engaging contact 228 and armature 245, and disengaging contact 246 and armature 247. Connected to junction 224, which is energized as above when switch 201 is in the automatic position, is a circuit that is completed when normally open contact 228 and armature 245 are engaged by the energization of relay 237, and comprised of contact 228, armature 245, lead 250, normally engaged contact and armatures 251, 252, lead 254, normally engaged contact and armatures 256, 257 (closed when limit relay 120 is energized, i.e., fulcrum block 46 is within either end of its predetermined limits) lead 258 and power control relay 93 to operate motor 62. The energization of relay 93 in this manner pulls armatures 85 downward into engagement with contacts 87 to operate motor 62 in a counter clockwise direction.

Since the shaft 64 of motor 61 is connected through a normally engaged clutch 261 to the shaft 63 of motor 62, shaft 64 rotates in a counter clockwise direction. Shaft 64 through a gear box 22 and shaft 20 adjusts the position of the fulcrum block 46. Shaft 64 adjusts variable speed drive 16 to increase the speed of output shaft 19. This adjustment of the fulcrum block and the variable speed drive changes the instantaneous rate of rotation and the average rate of rotation of cutting knives 14 so that they cut longer sheets and at the instant of cut the knives will be brought to the speed of the material being fed thereto.

When these above adjustments cease, the cutting knives 14 will continuously cut sheets of the same lengths. The adjustments cease at the time the length of the sheet being cut and length selected on selector 136 are the same. Thus, when the speed of the output shaft 19 is decreased, the shaft speed of the tachometer 112 also is decreased, thereby decreasing its voltage signal. When this voltage signal becomes small enough the differential voltage signal at wipers 134 and 144 disappears. When this differential voltage signal disappears, pointer 164 moves to the right disengaging from contact 165, thereby de-energizing relay 169 which will disengage contact 230 from armature 231 and de-energize relay 237. The de-energization of relay 237 disengages contact 228 and armature 245 de-energizing relay 93 to stop motor 62. This stops further adjustment of the fulcrum block flow 46 and the variable speed drive 16.

The foregoing has described the operation of the fine adjustment motor 62 for the automatic adjustment of the sheet length being cut when the sheet length actually being cut is too short. This novel control system also makes pointer adjustments when the sheet length being cut by knives 14 is too long.

If a length of sheet longer than the length selected on selector 136 is being cut by the knives 14, the pointer 173 will move into the scale region marked "too long" (not shown). The greater this difference, the greater pointer 173 deflects until it engages contact 174 and energizes relay 176. The energization of relay 176 engages contact 281 and armatures 282, to supply excitation from lead 110 through leads 283 and 284 to relay 284. Upon energization relay 284 pulls its armatures downwardly and contacts 285, 286 and 287 are engaged by armatures 288, 289 and 290 and contacts 280 and 291 and are disengaged with armatures 292 and 252 respectively. Automatic position of hold button 201 supplies power from source 100 to junction 224 and contact and armatures 287, 280 being engaged due to the energization of relay 284, thus power is supplied by way of lead 293, armature and contact 246, 247, lead 294, normally closed contact and armature 296, 297, and lead 298 to relay 92. (Closed when limit relay 127 is energized, i.e., fulcrum block 46 is within either end of its predetermined limits.) Upon energization relay 92 pulls its armatures downwardly to operate motor 62 in a clockwise direction to adjust fulcrum block 46 and speed drive ratio control 16. These adjustments increase the speed of output shaft 19 to cause the knives 14 to cut shorter sheets. These adjustments will continue until the increased voltage from tachometer 112, due to its higher speed, becomes sufficiently less negative with respect to the voltage from tachometer 111, that pointer 173 moves to the left and disengages from contact 174. This disengagement de-energizes relay 176 whose armature and contact 282, 281 disengage to open the circuit to relay 284. The de-energization of relay 284 disengages contact 287 and armature 290 to de-energize relay 92 and stop motor 62.

Should the above adjustments be stopped and the length of sheet being cut by knives 14 not be exactly the length of the sheet length set on selector 136, this condition will be indicated by a displacement of the pointer of meter 162 to the left or right of center. Manual remote buttons 270 and 310 is provided for changing the length of sheet being cut to correspond to the length set on selector 136. Should pointer indicate the length of sheet being cut is longer than the sheet length set on selector 136, button 310 is depressed, thereby bridging contact point 312 and supplying power from junction 224 to lead 293 to energize relay 92 and operate motor 62 counter clockwise just as did the engaging of contact 287 with armature 280 as described above. The operation of motor 62 will cause pointer 164 to move to the left and when the pointer 164 is centered the length of sheet being cut corresponds to the length set on selector 136. Button 310 is released to stop further adjustments. Should the sheet length being cut by knives 14 not correspond to the sheet length set on selector 136, pointer 173 is displaced from center. Manual remote button 270 is provided for changing the sheet length being cut to correspond with the sheet length selected on selector 136. If the pointer 164 indicates that a shorter length of sheet is being cut than the length set on selector 136, then button 270 is depressed, bridging contacts 271 so that current will flow from junction 224 to lead 250 to engage relay 93 which causes motor 62 to operate. Motor 62 will cause the pointer 164 to operate until pointer 164 moves toward the center of meter 162 and when the pointer centers the sheet length being cut corresponds to the sheet length set on selector 136. Button 270 is released, stopping any further adjustment.

Contacts 165 and 174 may be made adjustable in conventional manner such as by set screw, so that the movement of pointers 164 and 173 can be larger or smaller in order to engage the contact before engagement takes place. Thus the difference between the sheet length being cut and the sheet length set on selector 136 is necessary to activate the adjustment motors 61 and 62 by varying the distance of contact 165 and 174 from the center of meter 162.

Interlocks are provided so that only one motor 61 or 62 can be energiezd at any time. Motor 61 is actuated by the energization of relay 94 or 95, and motor 62 is actuated by the energization of 92 or 93. When relay 92 is energized, the opening of armature and contact 320, 321 prevents the energization of motor 61; when relay 93 is energized the opening of armature and contact 322, 323 prevents the energization of motor 61; when relay 94 is energized the opening of armature and contact 222, 221 prevents the energization of motor 62; and when relay 95 is energized, the opening of armature and contact 219 and 217 prevents the energization of motor 62.

"Automatic-hold" switch 201 also provides a means for selecting a new length of sheet to be cut while the cutters are cutting the length of sheet previously selected, and also provides for the selective energization of the coarse motor 61. By switching to the hold position, bridge 215 is disengaged from contact 214, and bridge 402 engages with contacts 403. The disengagement of bridge 215 and contact 214, de-energizes junction 224, thus preventing energization of relays 92 and 93 to prevent energization of motor 62. The engagement of bridge 402 and contact 403 connects power source 100 to lead 407 to a junction 409 for a pair of parallel circuits. One circuit energizes lead 421 armature and contacts 419, 239 and 285. The latter circuit comprises leads 421, armature and contact 320, 321, lead 412, armature and contact 322, 323, lead 413, junction 415, to armature 417, lead 426, junction 427, lead 428 to contact 419, leads 429 and 430 to contact 239 and lead 431 to contact 285. It may be seen from the preceding, that moving the switch 201 from "auto" to "hold" prevents energization of the motor 62 and from the following it will also be apparent that this also prevents energization of motor 61 until the machine operator is ready to energize it, thus allowing the operator to select a new sheet length on selector 136 without changing the sheet length being cut.

Automatic adjustment by the coarse adjustment motor 61 may be desirable when making a change of sheet length to be cut of more than several inches and when such a change is desired automatic-hold switch 201 is changed to the "hold" position as described above, and then the adjustable sheet length selector 136 is rotated to select a new sheet length to be cut. If the new sheet length selected is longer than the previous length which is still being cut by the cutters C there will be a negative differential voltage on slider 144 relative to slider 134 due to the differences in voltage produced by the tachometers 111 and 112 with relation to the settings of potentiometer 132 and 128. This differential voltage being amplified by amplifier 148 and carried to meter-relay 162, the pointer 164 will be deflected into the "too short" region of meter-relay 162. The greater the difference between the sheet length selected on selector 136 and the sheet length being cut by knives 14 of cutters C the greater the deflection of pointer 164 until finally the adjustable contact 165 is engaged by pointer 164. When contact is made between pointer 164 and contact 165 a circuit is completed which energizes relay 169, which energizes relay 237, which engages contacts 239 and armature 240, contact 243 with armature 244 and disengages contact 241 from armature 242. Since power is present at contact point 239 the engaging of contact 239 with armature 240 carries power to lead 440, junction 441, lead 442, junction 443 and parallel circuits to contact 444 and armature 445.

Automatic adjustment by the coarse adjustment motor is now possible but this does not take place until push button 450 is depressed. When push button 450 is depressed curent flows from contact point 444 across bridge 451 to contact point 453, to junction 454, and from there to parallel circuits one of which energizes time delay close relay 457, one of which energizes time delay open relay 459, and one of which energizes contact 461. After time delay open relay 459 is energized instantaneous armature 445 engages with contact point 461, which completes a holding circuit for push button 450 whereby current may still flow from junction 441 to time delay close relay 457 and time delay open relay 459 so as to keep these relays energized when push button 450 is released. Also engaging after time delay relay 459 is energized are contact 183' and instantaneous armature 182, contact 419 and armature 465. The engaging of contact 183' with armature 182 shunts the dampening circuit connected to amplifier 148 across the feedback resistor 183. The energization of time delay close relay 457 disengages contact 471 from armature 472 and engages contact 411 with armature 473 and contact 475 with armature 417. Normally closed time delay close auxiliary interlock contact 471 disengages from armature 472 before contact 419 and armature 465 close thus preventing current from flowing through lead 477 to brake contactor relay 479. When contact 419, which is energized as above, engages armature 465, a circiut is completed which energizes clutch 261, by carrying current from contact 419 to armature 465, lead 482, junction 483, normally closed contact 484, armature 485 (closed when limit relay 127 is energized), lead 486, normally closed contact 487, armature 488 (closed when limit relay 126 is energized), lead 489, rectifier junction 490 in rectifier 491, rectifier junction 492, lead 493, resistor 494, clutch coil 481, and back to rectifier 491. After a suitable delay, which allows the clutch 261 to be energized, thus disconnecting the fine adjustment motor 62 from the coarse adjustment motor 61, time delay close contact 475 and armature 417 close. Thus when relay 237 is energized by the closing of contacts 164 and 165 in meter 162 as above, contact point 243 and 244 are engaged and this completes a circuit to relay 95 through armature 417, contact 475, lead 476, contact 243, armature 244, contact 291, armature 292 and lead 495. The energization of relay 95 pulls its armatures downwardly thus engaging contacts 91 with armatures 89 respectively, thus disengaging contact 217 from armature 219 and thus closing contact 501 with armature 502. When relay 95 is energized, therefore, power is supplied to motor 61. Closing of contact 501 and armature 502 causes an auxiliary circuit to be completed from lead 503 to light 504 which indicates that the coarse adjustment motor 61 is energized.

Energization of motor 61 in this manner causes shaft 64 to rotate in a counter clockwise direction. The rotation of shaft 64 causes fulcrum control shaft 20a to adjust the position of the fulcrum block 46 in the changing mechanism E through gear box 22 and likewise causes the variable speed drive ratio control shaft 21 to rotate in a clockwise direction, the latter causing the speed of the variable speed drive output shaft 19 to decrease in speed.

When the fulcrum block 46 in the accelerating and decelerating mechanism E is adjusted by the counter clockwise movement of the shaft 20a and the variable speed drive output shaft 19 decreases its angular velocity, the average r.p.m. of the cutting knives 14 is decreased and the instantaneous r.p.m. of cutters C is varied so that the cutters C will cut shorter and shorter sheets. When these adjustments stop then the cutters C continuously cut the same sheet lengths.

The above adjustments are caused to stop when the length of the sheets being cut by the cutters C is the same as the sheet length selected on the sheet length selector 136, which causes the opening of the contacts 164 and 165 in meter 162 which occurs after the sheet length being cut is decreased in length as described above. When contacts 164 and 165 in meter 162 are opened relays 169 and 237 are de-energized, and when the latter is de-energized the armatures connected thereto are pulled upwardly which causes the disengagement of contact 239 and armature 240 which causes relays 457 and 459 to be de-energized. All contacts connected to time delay close relay 457 operate immediately, contacts 475 to close with armatures 417 and contact 411 to close with armature 473. Since there is about a one second delay in the disengagemnt of contact 465 and armature 419 after the de-energization of relay 459 and after the engagement of contact 471 and armature 472, brake 480 is energized at the same time motor 61 is de-energized. The circuit that is completed to energize the brake 480 causes current to flow from contact 471 to armature 472, to relay 479. When relay 479 is energized contacts $479_1$ engage with armatures $479_{11}$ thus carrying current through leads $83_1$ to brake coil 480 from power source 80. After being energized for about a second the brake 480 is de-energized by the disengaging of contact 419 and armature 465. At the same time contact 419 and armature 465 is disengaged clutch 261 is de-energized by the disengaging of contact 419 and armature 465. De-energization of clutch 261 re-engages motor 61 and 62. Disengagement of contact 461 and armature 445 opens the holding circuit for push button 450, and the disengagement of contact $183_1$ and armature 182 restores the dampening circuit across feedback resistor 183.

Since the dampening circuit across feedback resistor 183 above described increases the response time of the amplifier 148 to differential voltage changes between wiper 144 and 134 which occur while the variable speed drive 16 is being adjusted, the adjustable contacts in meter relay 162 would not break contact with the pointers in meter 162 until some time after the differential voltage has disappeared. As a result the coarse motor 61 would continue to run past the desired adjustment point to such a degree that considerable time would be required to return the output and input shafts of the variable speed drive 16 to the correct ratio for the selected sheet length. Thus since the dampening circuit is shunted out by the closing of contact point $183_1$ and armature 182 the meter-relay pointers will break contact at very nearly the time when the ratio of the input and output shafts of the variable speed drive is correct for the sheet length selected.

If when a change in sheet length is desired of several inches or more and a new sheet length selected on the sheet length selector 136 is shorter than the sheet length being cut by the cutters 14 a similar operation takes place as described above only the motor 61 is made to rotate clockwise instead of counter-clockwise which was the case when the sheet length selected was longer than the sheet length being cut. First the automatic-hold switch 201 is switched from "automatic" to "hold." When the new sheet length which is several inches or more shorter than the sheet length being cut by the knives 14 is selected on the sheet length selector 136 this causes the voltages produced by tachometers 111 and 112 to produce a negative differential voltage on slider 144 relative to adjustable slider 134. This differential voltage being amplified by amplifier 148 and carried to meter relay 162 the pointer 173 will be deflected into the "too long" region of meter-relay 162. The greater the difference between the sheet length being cut by the knives 14 and the sheet length selected on the sheet length selector 136 the greater the deflection of pointer 173 until finally the pointer 173 engages contact 174 which completes a circuit from a direct current source such as battery 166 to relay 176. When relay 176 is energized contact 281 closes with armature 282 which supplies current through leads 283 and $284_1$ to relay 284. The energization of relay 284 closes contact 285 with armatures 288 and contact 286 with armature 289. Push button 450 must then be depressed to actuate motor 61. To that end when push button 450 is depressed current flows from contact 443 across bridge 451 to contact point 454 and from there to time delay close relay 457 and time delay open relay 459. After relay 459 is energized armature 445 and contact 461 engage thus completing a holding circuit for push button 450 as above described. Also engaging after time delay relay 459 is energized are contact point $183_1$ and armature 182, contact 419 and armature 465. The engaging of contact $183_1$ and armature 182 shunts out the damping circuit connected across the feedback resistor 183. The energization of time delay close relay 457 disengages contact 471 from armature 472, engages contacts 411 with armature 473 and contact 475 with armature 417. Normally closed contact 471 and armature 472 disengage before contact 419 and armature 465 connected to relay 459 close, thus preventing current from flowing through lead 477 to brake contactor relay 479. When contact 419 and armature 465 engage a circuit is completed from contact 419 to clutch 261 as described above. After a suitable delay which allows the clutch 261 to be energized, thus to disconnect the fine adjustment motor 62, from the coarse adjustment motor 61, time delay close contact 475 and armature 417 engage. Since relay 284 has been energized contact point 286 and armature 289 are engaged and this completes a circuit from armature 289 to relay 94 which causes motor 61 to be energized. This circuit is completed from armature 417, to contact 475, lead 476, contact 286, armature 289, normally closed armature 242 and contact 241, lead 521 to relay 94. The energization of relay 94 causes its armatures to be pulled downwardly so that contacts 90 engage armatures 88 to allow motor 61 to be energized from leads 81, contact 221 disengages from armature 222 to prevent the simultaneous energization of motor 62 and contact 525 to engage armature 526, causing light 504 to light, indicating that the coarse adjustment motor is energized. Energization of motor 61 in this manner causes shaft 64 to rotate in a clockwise direction. This rotation of shaft 64 causes fulcrum control shaft 20a to adjust the position of the fulcrum block 46 in the changing mechanism and also causes the variable speed drive ratio shaft 21 to rotate in a counter clockwise direction, the latter causing the variable speed drive output shaft 19 to increase in speed. When the fulcrum block 46 in the changing mechanism D and the variable speed drive 16 are adjusted in this manner the cutters 14 will cut shorter and shorter sheets. When these adjustments stop then the cutters 14 will continuously cut the same sheet lengths.

By decreasing the length of the sheets being cut by the cutters 14 as above, the sheet length being cut will ultimately be the same as the sheet length selected on the sheet length selector 136, at which time further adjustment ceases. To this end when the angular velocity of the variable speed drive output shaft 19 is increased the shaft speed of the tachometer 112 is increased and the voltage output of tachometer 112 is increased since the voltage output from tachometer 111 remains constant. When this voltage is increased far enough the differential voltage between tachometer 111 and 112 at wipers 144 and 134 will disappear. When this differential voltage disappears the pointer 173 will move to the left until pointer 173 and contact 174 are disengaged. Opening these contacts de-energizes relay 176 and this disengages contact 281 and armature 282 which in turn de-energizes relay 284. When relay 284 is de-energized its armatures are pulled upwardly, thus contact 285 and armature 288 are disengaged, contact 286 and armature 289 are disengaged, and contact 291 and armature 292 are engaged. The opening of contact 286 and armature 289 de-energizes relay 94 which in turn opens contacts 90 and armature 88. When the latter are opened motor 61 is de-energized and further adjustment of the accelerating and decelerating mechanism D by the fulcrum control shaft 20a and the variable speed ratio control shaft 21 ceases. The opening of contact 285 and armature 288 causes relays 457 and 459 to be de-energized, thus energizing the brake 480 for about a second, as described above in relation to the disengagement of contact 239 and armature 240 which caused relays 457 and 459 to be de-energized. Similarly after a second the brake 480 is de-energized, the damping circuit across feedback resistor 183 is restored and the clutch 261 is re-engaged.

If the above adjustments by the coarse adjustment motor are stopped and the sheet length being cut by knives 14 is not exactly the same as the sheet length selected on the sheet length selector 136 then further adjustment by the fine adjustment motor 62 is accomplished by returning the hold-automatic switch 201 from "hold" to "automatic." After this is done push buttons 270 and 310 can be used for further adjustment with the fine adjustment motor 62.

It is important in this novel control system that when the sheet length being cut by the knives 14 is too long or too short with respect to the sheet length selected on the adjustable sheet length selector 136 an appropriate indicator light is lit on a control panel. If the setting on the dial of the adjustable sheet length selector 136 is longer than the sheet length being cut by the cutters 14 for any reason such as a rotation of selector 136 the pointer 164 will move to the left into the region of the meter-relay 162 marked with the words "too short" (not shown) and when the pointer 164 moves far enough to the left adjustable contact 165 is engaged by pointer 164 and relay 169 is energized. The energization of relay 169 causes contact point 230 and armature 231 to engage. Current then flows from contact point 230 to contact point 601. Since contact point 601 is normally engaged by armature 602 current flows through lead 233 to illuminate the light 605 marked with the words "too short" (not shown) and visually indicates that the sheet length being cut is too short.

When the sheet length being cut by the cutters 14 is shorter than the sheet length set on selector 136 the pointer 173 will move to the right into the region of meter-relay 162 marked with the words "too long" (not shown). When pointer 173 moves far enough to the right adjustable contact 174 engages pointer contact 173 and relay 176 is energized. The energization of relay 176 causes contact 281 and armature 282 to engage and contact 607 and armature 609 being normally engaged, current flows through lead 283 to light 611 marked with the words "too long" (not shown) thus visually indicating that the sheet length being cut is too long.

As discussed above the energization of lead 112 normally energizes relays 120 and 127. This is only the case, however, when the fulcrum block 46 of the changing mechanism D is within certain limits of its adjustment. When the fulcrum block 46 reaches the limit of its adjustment in one direction which is caused by the rotation of motor 61 or 62 in a counter clockwise direction armature 117 is disengaged from contact point 118. This de-energizes relay 120 thus opening armature 602 from contact point 601 which prevents light 605 from being energized through lead 233, thus opening contact 256 from armature 257 which prevents the energization of motor 62 in a counter clockwise direction, and thus opening armature 617 from contact 615 which prevents energization of motor 61 until the fulcrum block 46 is brought back within its operating limits by motor 62. The machine operator is notified that the fulcrum block has reached the limit of its travel in one direction by the illumination of light 611. To this end when relay 120 is de-energized contact 621 and armature 623 are closed which causes current to flow from lead 110 to lead 625 across armature 623 and contact 621, normally closed armature 627 and contact 629, lead 631, lead 633 to light 611. Current also flows to bimetallic element 635 which opens and closes due to the heat caused by energizing it and as it opens it causes armature 627 to open and as it closes it causes armature 627 to close, thus causing the light 611 to flash on and off.

In a similar manner as described above when the fulcrum block 46 reaches the limit of its adjustment in the other direction which is caused by the rotation of motor 61 or 62 in a clockwise direction armature 124 is disengaged from contact 125. This de-energizes relay 127 thus opening contact 607 from armature 609 which prevents light 611 from being energized through lead 283, thus opening contact 296 from armature 297 which prevents energization of motor 62 in a clockwise direction and thus opening contact 635 and armature 637 which prevents the energization of motor 61 until the fulcrum block 46 is brought back within its operating limits by motor 62. The machine operator is similarly notified that the fulcrum block has reached the limit of its travel in this other direction by the illumination of light 605. To this end when relay 127 is de-energized contact 639 and armature 641 are closed which causes current to flow from lead 110 to lead 642 across contact 639 armature 641 normally closed contact 645 and armature 647, and lead 649 to light 605. Current also flows from lead 649 to bimetallic element 651 which opens and closes due to the heat caused by energizing it and as it opens it causes armature 647 to open and when it closes it causes armature 647 to close, thus causing light 605 to flash on and off.

With the cut-off knives, balanced accelerating and decelerating mechanism for the cut-off knives, and control system heretofore above described, it is possible to shear strip material by means of rotary shears internally well balanced and which can be readily regulatable regardless of the fact that the shears might be in operation while still maintaining the balance for any desired sheet length. Also it is possible to cut sheets very accurately to pre-determined lengths and to determine these lengths automatically or manual remotely.

In the embodiment described the same exact sheet lengths will be cut regardless of whether the feed rolls B speed up or slow down but only as long as there is no slippage of material between the feed rolls B. In another embodiment one tachometer generator 112 is connected to the output shaft of the variable speed drive 16 and another tachometer $111_1$ (FIG. 2) is mounted with a pick-up directly contacting the board passing into the cutters C. This latter arrangement causes the former tachometer to give a voltage proportional to the speed of the output shaft 19 of the variable speed drive 16 and the latter tachometer to give a voltage proportional to the speed of the paper 650 passing into the cutters C. These tachometers are then connected exactly as described above and as shown in FIGURE 1. Thus in this embodiment, with the connections as described above, exact adjustment of sheet length is made regardless of material slippage.

What is claimed is:

1. A device for selectively cutting a continuously moving web of material into lengths comprising means for feeding the web, rotatable means for periodically cutting the web, adjustable variable speed means connected to said web feeding means and to said cutting means for providing a selected operating speed ratio between said web feeding means and said cutting means so that the web may be selectively cut into lengths which vary directly with the speed ratio, means connected to said cutting means for generating a signal corresponding to the cutting speed, means connected to said web feeding means for generating a signal corresponding to the speed of web feed, means for receiving the signals so generated, adjustable means for selecting the sheet length to be severed, said adjustable means being operatively connected to said signal receiving means to determine therein a reference value, said signal receiving means being operative to compare the realtive values of the signals with the reference value, a null signal resulting from such comparison when said web feeding means and said cutting means operate at a speed ratio whereat the severed sheet length corresponds to the selected sheet length and an error signal resulting from such comparison when the speed ratio changes to sever a sheet length deviating from the selected sheet length and means connected to said variable speed means responsive to the error signal for automatically restoring the speed ratio to a value whereat the severed sheet length again corresponds substantially to the selected sheet length.

2. A device for selectively cutting a continuously moving web of material into lengths comprising means for feeding the web, rotatable means for periodically cutting the web, adjustable variable speed means connected to said web feeding means and to said cutting means for providing a selected operating speed ratio between said web feeding means and said cutting means so that the web may be selectively cut into lengths which vary directly with the speed ratio, means connected to said cutting means for generating a signal corresponding to the cutting speed, means connected to said web feeding means for generating a signal corresponding to the speed of web feed, means for receiving the signals so generated, adjustable means for selecting the sheet length to be severed, said adjustable means being operatively connected to said signal receiving means to determine therein a reference value, said signal receiving means being operative to compare the relative values of the signals with the reference value, a null signal resulting from such comparison when said web feed means and said cutting means operate at a speed ratio whereat the severed sheet length corresponds to the selected sheet length and an error signal resulting from such comparison when the speed ratio changes to sever a sheet length deviating from the selected sheet length, first means responsive to the error signal to visually indicate the presence of error and second means responsive to the error signal and connected between said first means and said variable speed means for automatically decreasing the error by adjusting the speed ratio.

3. A device for selectively cutting a continuously moving web of material into lengths comprising means for feeding the web, rotatable means for periodically cutting the web, adjustable variable speed means connected to said web feeding means and to said web cutting means for providing a selected operating speed ratio between said web feeding means and said cutting means so that the web may be selectively cut into lengths which vary directly with the speed ratio, means connected to said cutting means for generating a signal corresponding to the cutting speed, means connected to said web feeding means for generating a signal corresponding to the speed of web feed, means for receiving the signals so generated, adjustable means for selecting the sheet length to be severed, said adjustable means being operatively connected to said signal receiving means to determine therein a reference value, said signal receiving means being operative to compare the relative values of the signals with the reference value, a null signal resulting from such comparison when said web feeding means and said cutting means operate at a speed ratio whereat the severed sheet length corresponds to the selected sheet length and an error signal resulting from such comparison when the speed ratio changes to sever a sheet length deviating from the selected sheet length, first means responsive to the error signal to visually indicate the presence of error and second means responsive to the error signal connected between said first means and said variable speed means for automatically decreasing the error by adjusting the speed ratio, said correcting means including selectively operable fine and coarse adjusting means.

4. A device for selectively cutting a continuously moving web of material into lengths comprising means for feeding the web, rotatable means for periodically cutting the web, adjustable variable speed means having a first input shaft connected to said web feeding means and an output shaft connected to said web cutting means, said variable speed means being operative to provide a selected speed ratio between said web feeding means and said cutting means so that the web may be selectively cut into lengths which vary directly with the speed ratio, means connected to said output shaft for generating a signal corresponding to the cutting speed, means connected to said input shaft for generating a signal corresponding to the speed of web feed, means for receiving the signals so generated, adjustable means for selecting the sheet length to be severed, said adjustable means being operatively connected to said signal receiving means to determine therein a reference value, said signal receiving means being operative to compare the relative values of the signals with the reference value, a null signal resulting from such comparison when said web feeding means and said cutting means operate at a speed ratio whereat the severed sheet length corresponds to the selected sheet length and an error signal resulting from such comparison when the speed ratio changes to sever a sheet length deviating from the selected sheet length, motor means responsive to the error signal for automatically restoring the speed ratio to a value whereat the severed sheet length again corresponds to the selected sheet length and a second input shaft connecting said motor means to said variable speed means.

5. A device for selectively cutting a continuously moving web of material into lengths comprising means for feeding the web, rotatable means for periodically cutting the web, said cutting means including means for accelerating and decelerating said cutting means, adjustable variable speed means, a first input shaft connecting said variable speed means to said web feeding means, an output shaft connecting said variable speed means to said cutting means, said variable speed means being operative to provide a selected speed ratio between said web feeding means and said cutting means so that the web may be selectively cut into lengths which vary directly with the speed ratio, means connected to said cutting means for generating a signal corresponding to the cutting speed, means connected to said web feeding means for generating a signal corresponding to the speed of web feed, means for receiving the signals so generated, adjustable means for selecting the sheet length to be severed, said adjustable means being operatively connected to said signal receiving means to determine therein a reference value, said signal receiving means being operative to compare the relative values of the signals with the reference value, a null signal resulting from such comparison when said web feeding means and said cutting means operate at a speed ratio whereat the severed sheet length corresponds to the selected sheet length and an error signal resulting from such comparison when the speed ratio changes to sever a sheet length deviating from the selected sheet length, means responsive to the error signal for automatically adjusting the speed of the variable speed output shaft and the setting of said cutter accelerating and decelerating means thereby automatically adjusting both the average and the instantaneous speeds of said cutting means so as to correct the error, a second input shaft to said variable speed means connecting said adjusting means to said variable speed means and a control shaft connecting said adjusting means to said cutter accelerating and decelerating means.

6. A device for selectively cutting a continuously moving web of material into lengths comprising means for feeding the web, rotatable means for periodically cutting the web, adjustable variable speed means connected to said web feed means and to said web cutting means for providing a selected operating speed ratio between said web feeding means and said cutting means so that the web may be selectively cut into lengths which vary directly with the speed ratio, means connected to said cutting means for generating a signal corresponding to the cutting speed, means connected to said web feeding means for generating a signal corresponding to the speed of web feed, means for receiving the signals so generated, adjustable means for selecting the sheet length to be severed, said adjustable means being operatively connected to said signal receiving means to determine therein a reference value, said signal receiving means being operative to compare the relative values of the signals with the reference value, a null signal resulting from such comparison when said web feeding means and said cutting means operate at a speed ratio whereat the severed sheet length corresponds to the selected sheet length and an error signal resulting from such comparison when the speed ratio changes to sever a sheet length deviating from the selected sheet length, first means responsive to the error signal to visually indicate the presence of error and second means responsive to the error signal and connected to said variable speed means for automatically adjusting the speed ratio to decrease the error, said correcting means including a coarse adjusting motor and a fine adjusting motor, siad motors being selectively operable.

7. A device for selectively cutting a continuously moving web of material into lengths comprising means for feeding the web, rotatable means for periodically cutting the web, said cutting means including means for accelerating and decelerating said cutting means, adjustable variable speed means, a first input shaft connecting said variable speed means to said web feeding means, an output shaft connecting said variable speed means to said cutting means, said variable speed means being operative to provide a selected speed ratio between said web feeding means and said cutting means so that the web may be selectively cut into lengths which vary directly with the speed ratio, means connected to said cutting means for generating a signal corresponding to the cutting speed, means connected with said web feeding means for generating a signal corresponding to the speed of web feed, means for receiving the signals so generated, adjustable means for selecting the sheet length to be severed, said adjustable means being operatively connected to said signal receiving means to determine therein a reference value, said signal receiving means being operative to compare the relative values of the signals with the reference value, a null signal resulting from such comparison when said web feeding means and said cutting means operate at a speed ratio whereat the severed sheet length corresponds to the selected sheet length and an error signal resulting from such comparison when the speed ratio changes to sever a sheet length deviating from said selected sheet length and means connected to said variable speed means and said cutter accelerating and decelerating means for automatically adjusting both the speed of said variable speed output shaft and the setting of said cutter accelerating and decelerating means thereby automatically adjusting both the average and the instantaneous speeds of said cutting means so as to correct the error, said adjusting means including a coarse adjusting motor and a fine adjusting motor, said motors being selectively operable.

References Cited by the Examiner

UNITED STATES PATENTS

| | | | |
|---|---|---|---|
| 2,023,243 | 12/35 | Rhea et al. | 83—76 |
| 2,059,412 | 11/36 | Swift | 83—311 |
| 2,879,845 | 3/59 | Haas | 83—72 |
| 3,029,675 | 4/62 | Alexander et al. | 83—76 |

ANDREW R. JUHASZ, *Primary Examiner.*

HUNTER C. BOURNE, JR., *Examiner.*